US008284773B1

(12) United States Patent
Woleben et al.

(10) Patent No.: US 8,284,773 B1
(45) Date of Patent: Oct. 9, 2012

(54) ADVANCED JOINING INTO MULTICAST GROUP TO FACILITATE LATER COMMUNICATION AMONG GROUP MEMBERS

(75) Inventors: Samuel M. Woleben, Lenexa, KS (US); Zheng Cai, Fairfax, VA (US); Iris Zeng, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1272 days.

(21) Appl. No.: 11/933,859

(22) Filed: Nov. 1, 2007

(51) Int. Cl.
*H04L 12/28* (2006.01)
(52) U.S. Cl. .... 370/390; 370/310; 455/90.2; 455/422.1; 455/518; 455/519; 709/227; 709/228
(58) Field of Classification Search .................. None
See application file for complete search history.

(56) References Cited

U.S. PATENT DOCUMENTS

| 2002/0091926 | A1  | 7/2002 | Fukutomi |
| 2007/0019645 | A1* | 1/2007 | Menon ............................ 370/390 |
| 2007/0183458 | A1* | 8/2007 | Bouazizi et al. ............... 370/498 |
| 2008/0084878 | A1* | 4/2008 | Akbar et al. ................... 370/390 |

OTHER PUBLICATIONS

U.S. Appl. No. 10/636,721, filed Aug. 7, 2003.
Kim and Woo, "Algorithm for VOD Services Using Multicast," dated Oct. 17, 2003, http://atnac2003.atcrc.com/POSTERS/Kim.pdf, printed from the World Wide Web.
Hwang and Kim, "Multimedia Delivery Service Using Multicast Technique on the Head-End-Network," IJCSNS International Journal of Computer Science and Network Security, Feb. 2006.
ASTi, "ASTi Application Note 33: Interoperating with CCTT SINCGARS," https://www.asti-use.com/support/appnotes/33.html, printed from the World Wide Web, Jan. 24, 2007.
Javvin, "GCMP: Cisco Group Management Protocol Overview," http://www.javvin.com/protocolCGMP.html, printed from the World Wide Web, Jan. 24, 2007.
ASP.net Blogs, "Jason Salas' WebLog: Sending Single Recipient Messages Over Multicast UDP Within P2P Network," dated Nov. 9, 2004, http://weblogs.asp.net/jasonsalas/archive/2004/11/09/254193.aspx, printed from the World Wide Web.
Luby et al., Asynchronous Layered Coding, A Scalable Reliable Multicast Protocol, RMT Working Group, Internet Draft, dated Mar. 8, 2000.

* cited by examiner

*Primary Examiner* — Ayaz Sheikh
*Assistant Examiner* — Nicholas Sloms

(57) ABSTRACT

A method and system for establishing group multicast communication, such as PoC multicast communication. Multiple terminals will join a PoC multicast group automatically at some point before the underlying PoC session is being initiated and thus before there is any PoC content for a PoC server to multicast to the group members. Further, this joining process will occur without the PoC multicast channel being listed in the terminals' multicast channel listings. Thereafter, when one of the terminals opts to initiate the PoC session and thus signals to the PoC server, the server will cause the participating terminals to tune to the associated PoC multicast channel for the PoC multicast group that the terminals had already joined. The invention thereby helps to effectively randomize the timing of join-signaling by the various terminals and thus helps to conserve network resources.

20 Claims, 6 Drawing Sheets

ADVANCED JOINING INTO MULTICAST GROUP TO FACILITATE LATER COMMUNICATION AMONG GROUP MEMBERS

BACKGROUND

In a typical cellular wireless network, a geographic area is divided into cell sectors. Each cell sector defines a geographic area in which wireless terminals (such as cellular telephones, personal digital assistants (PDAs) and/or other devices) operate. The wireless network normally has a base transceiver station (BTS) assigned to one or more cell sectors. The BTS produces a radio frequency (RF) radiation pattern over the one or more cell sectors. The RF radiation pattern allows the wireless terminals located in the one or more cell sectors to exchange signals with the BTS over an air interface.

The wireless network typically has a plurality of BTSs. The plurality of BTSs communicates concurrently with a base station controller (BSC) or the like that aggregates signals received from the plurality of BTSs. The plurality of BTSs and the BSC is commonly referred to as a base station. And the wireless network may have a plurality of base stations. The plurality of base stations in the wireless network is referred to as a base station system (BSS).

Each BSC in the wireless network may communicate with a packet gateway and a mobile switching center (MSC). The packet gateway and the MSC function to set up and connect calls with other entities. For example, the packet gateway may set up and connect calls with a server or other entity on an Internet protocol (IP) network, and the MSC may set up and connect calls with a telephone on a public switched telephone network (PSTN).

Generally, the BSC will assign a traffic channel respectively to each wireless terminal for transmitting and receiving signals over the air interface. Additionally, the packet gateway establishes a radio-packet (R-P) link with the BSC. The R-P link carries signals between the packet gateway and the BSC. The packet gateway establishes a separate R-P link for each wireless terminal in the wireless network, and in this regard, the signals carried by each R-P link are associated with a particular wireless terminal. The R-P link is referred to as the A10/A11 link in the code division multiple access (CDMA) network architecture.

In some instances, a server in the wireless network may send media, or "content," to wireless terminals in the network. The content may represent information of interest to users of the wireless terminals, such as sports scores, weather reports, or advertising messages for instance. Alternatively or additionally, the content might comprise real-time streaming media such as voice or video conference content or broadcast television or radio signals. In any event, the server may transmit the content to one or more wireless terminals by inserting the content into one or more packets and transmitting the packets to the one or more wireless terminals.

If a server is going to transmit the same content to multiple wireless terminals (or for that matter to multiple network terminals of any kind), the server can unicast the content respectively to each terminal. That is, the server can establish a communication session respectively with each terminal and transmit a copy of the content to each terminal via the established unicast session with the terminal.

Unfortunately, however, one of the scarcest resources in a cellular communication system is the air interface between the BSS and the wireless devices. Typically, a given base station will operate at a designated carrier frequency, or at one frequency on the "forward link" (from the base station to wireless terminals) and at another frequency on the "reverse link" (from the wireless terminals to the base station). Communications in a given cell sector may then be divided into channels by spread-spectrum modulation and/or time-division multiplexing, for instance. However, a limited number of such channels will exist. Consequently, in a situation where multiple wireless terminals in a cell sector are all receiving the same unicast communication from a server, air interface resources in the cell sector can be depleted, which can adversely impact (e.g., block) other communications in the sector.

Another, more efficient way for a server to transmit the same content to multiple wireless terminals is to multicast the content. Multicasting essentially involves transmitting a single copy of the content to a multicast IP address and having all of the recipient terminals, or multicast group members, receive the transmission.

Using well known routing techniques, when content is transmitted to a multicast IP address, the content will be distributed to network nodes that serve multicast group members, and the nodes will then distribute the content to the group members. In cellular wireless communications, a wireless network may further maintain a multicast air interface link over which a base station can broadcast traffic destined to wireless multicast group members. Thus, to convey content from a multicast server to wireless terminals that are group members, the server may transmit the content to the applicable multicast IP address, network nodes may route the traffic to each base station system that serves members of the multicast group, and each base station system may then transmit the content over an air interface multicast link for receipt by group members that are in coverage.

To support multicast communications, under existing industry standards, a multicast server typically distributes to wireless terminals a "multicast channel listing" that specifies one or more multicast "channels" to which recipient wireless terminals can tune. (Alternatively, one or more multicast channels provided by various multicast servers could be cooperatively listed in a multicast channel listing generated by a wireless carrier or some other entity, and distributed to wireless terminals.) Each multicast "channel" represents a particular multicast group or multicast session having a corresponding multicast IP address (or the like) at which group members can receive associated multicast communications. The multicast channel listing generally specifies for each available channel a multicast "flow-ID" that can be used by a wireless terminal as a key to request membership in the multicast group, so that the terminal can then receive the associated multicast communications.

Since terminals may opt to tune to a given multicast channel at any time, the multicast server may regularly transmit content on each channel, just as broadcast television stations regularly transmit content on their channels. Upon tuning to a desired channel, a terminal may then begin to receive whatever content is currently being transmitted by the multicast server on that channel.

In practice, the multicast server or another entity may distribute the channel listing (e.g., by IP multicast communication) to various radio access networks or network entities, and base stations may then transmit the channel listing in an air interface paging channel message or other control channel message to wireless terminals in coverage. Upon receipt of the multicast channel listing, each wireless terminal may then store the channel listing for later reference by a user.

Thereafter, when a user of the wireless terminal is interested, the user may view the channel listing on a display screen of the terminal and may select a desired channel. In response, the wireless terminal may then transmit to the multicast server a JOIN request, seeking to join the multicast group that has the indicated flow-ID, and, after authenticating and authorizing the terminal, the multicast server may then provide the terminal with data that enables the terminal to receive and process the associated multicast communications. For example, the server may provide the terminal with the multicast IP address for the channel and with security information (e.g., a decryption key or the like), so that the terminal can receive and process packets destined to that multicast IP address, and thus receive and present the multicast communications on the selected channel.

OVERVIEW

Advantageously, multicast communications can be used to support an increasingly popular form of wireless communication known as push-to-talk (PTT) "walkie-talkie" service, or more generally push-to-x over cellular (PoC) service (where "x" represents any type of content, whether voice, video, or some other form).

With PoC, a user of a suitably equipped wireless terminal can "instantly" establish communication with one or more other users by simply pressing a PoC button on the cell phone. In practice, when the user presses the PoC button, the wireless terminal may responsively transmit to a PoC server on the network a PoC session initiation message that designates one or more target subscribers with whom to establish the PoC session. In response, the PoC server may then engage in session setup signaling with the initiating terminal and with each target terminal, to establish with each terminal a communication session through which each terminal can communicate with the server.

As described in co-pending U.S. patent application Ser. No. 11/407,121, filed Apr. 19, 2006 (the entirety of which is hereby incorporated by reference), the PoC server and/or an associated entity can be arranged to function as a multicast server, so as to efficiently distribute PoC session content to the various group members. Since PoC sessions are often half-duplex, all terminals other than the "talker," or terminal that currently holds the floor, will typically be in a receive-only mode. Thus, it makes sense to multicast the PoC session content to the session participants, rather than unicast the PoC session content to each session participant. (See the '121 application for a discussion of how communications in the other direction, namely to the PoC server, can be handled.)

Various techniques could be used to establish a multicast session through which the PoC server can multicast PoC session content to each participating terminal. In accordance with the technique described in the '121 application, for instance, the PoC server may transmit to each participating terminal, within the PoC session setup signaling, an indication of the multicast flow-ID for the PoC multicast session/group to be established. Each terminal may then responsively send a JOIN message to the PoC server (or some other multicast management entity), seeking to join the PoC multicast group indicated by the multicast flow-ID. And each terminal may responsively receive data (such as multicast IP address, etc.) that allows the terminal to tune to the newly established PoC multicast channel.

Thereafter, whenever the PoC server receives PoC session content from the terminal that holds the floor in the PoC session, the PoC server may simply multicast the content for receipt by each other PoC group member, i.e., for receipt by each member of the newly established PoC multicast group.

Unfortunately, however, the process of a wireless terminal joining a multicast group itself can consume valuable network resources, particularly air interface resources. For instance, if the wireless terminal engages in JOIN signaling (sending a JOIN request and receiving a reply, as well as any other back and forth communications related to joining a multicast group) over air interface control channels, the process can consume scarce air interface control channel resources. As another example, if the wireless terminal engages in JOIN signaling over air interface traffic channel, the process can consume scarce air interface traffic channel resources.

This can be especially problematic in a situation where many of the terminals that are joining the new PoC multicast group are operating in a common cell sector or other wireless coverage area, such as if the terminals are operated by workers at a single construction site, or by friends at a football game for instance). In that situation, the concurrent JOIN signaling by all of the participants in the PoC session can potentially deplete air interface resources in that sector or other coverage area The present invention provides an innovative method and system to help overcome this problem, by avoiding having all of the PoC session participants join the associated PoC multicast group at the same time when the PoC session is being initiated. In accordance with an exemplary embodiment of the invention, each terminal will instead join the PoC multicast group automatically at some point in advance, before the PoC session is even being initiated and thus before there is any PoC content for the server to multicast. Further, this joining process will occur without the PoC multicast channel being listed in the terminal's multicast channel listing.

Thereafter, when a given one of the terminals opts to initiate the PoC session and thus signals to the PoC server, the server will then cause the participating terminals to tune to the associated PoC multicast channel that the terminal had already joined. And so, in response, the terminals may simply tune to that PoC multicast channel without needing to engage in JOIN signaling at the time.

In a preferred embodiment, the server will cause the participating terminals to tune to the associated PoC multicast channel, by adding (or causing some other entity to add) the PoC multicast channel to the multicast channel listing that is distributed to wireless terminals. Further, each terminal will be programmed (i) to detect that their multicast channel listing now contains a channel for a multicast group that the terminal had already joined and (ii) to responsively simply tune to that multicast channel. Thus, each terminal that had joined the PoC multicast group will detect the presence of the PoC multicast channel in the multicast channel listing and, since the terminal had already joined that multicast group, would then simply tune to the PoC multicast channel to readily begin receiving PoC session content.

More generally, an exemplary embodiment of the invention may take the form of a method for establishing multicast communications. According to the method, multiple terminals will each join a multicast group and, upon joining, receive data (such as a multicast IP address, etc.) defining an associated multicast channel for the group. Thereafter, a network entity will receive a request to initiate a communication session among the multiple terminals. In response to the initiation request, the network entity will then trigger transmission of a multicast-listen signal each of the terminals. And each terminal will respond to the multicast-listen signal by tuning to the multicast channel, so that the terminal can receive group communication content conveyed via the multicast channel.

In a more specific embodiment, the invention may take the form of a method for establishing PoC multicast communication for a PoC session among a set of wireless terminals. According to the method, each terminal in the set will join a PoC multicast group, automatically upon power-on (i.e., upon transitioning to a power-on state) or automatically in response to some other trigger event. Each terminal will preferably be pre-provisioned with a PoC multicast flow-ID designated for the group and will be programmed to automatically send the JOIN message keyed to that PoC multicast flow-ID. After sending the JOIN message and being authenticated and so forth, the terminal will then receive from the server some data (e.g., a multicast IP address, etc.) that will enable the terminal to receive communications that are multicast to the PoC multicast group. At the time of joining the multicast group, however, the PoC multicast channel will not be listed in the terminal's multicast channel listing, and there would not yet be a request to initiate the PoC session.

At some point thereafter, one of the terminals will seek to initiate the PoC session among the terminals and will thus signal to a PoC server (possibly the same server that handled JOIN messaging). In response, the PoC server will then add, or cause another entity to add, the PoC multicast channel to the multicast channel listing that is distributed to wireless terminals. Optimally, the multicast channel listing will specify for the PoC multicast channel the same PoC multicast flow-ID that the terminal had used to join the PoC multicast group.

In turn, each terminal that had joined the PoC multicast group will then detect that the multicast channel listing now lists the PoC multicast channel having the applicable PoC multicast flow-ID. And in response, the terminal will then simply tune to that multicast channel to begin receiving any PoC multicast communications, yet without the need to engage in JOIN signaling at that time.

Advantageously, by having the various PoC terminals join the PoC multicast group before the PoC session is being initiated, the problems noted above can be alleviated. In particular, by having the terminals automatically join the PoC multicast group at power-on or in response to some other triggering event that is terminal specific, the times at which the terminals will join the PoC multicast group can be effectively randomized, thus distributing over time the use of network resources for the JOIN process, thus helping to avoid overload of network resources.

These as well as other aspects, advantages and alternatives will become readily apparent to those of ordinary skill in the art by reading the following detailed description, with reference where appropriate to the accompanying drawings. Further, it should be understood that the description provided in this section and elsewhere is intended to explain the invention by way of example only and not by way of limitation.

DETAILED DESCRIPTION

Figure 1:
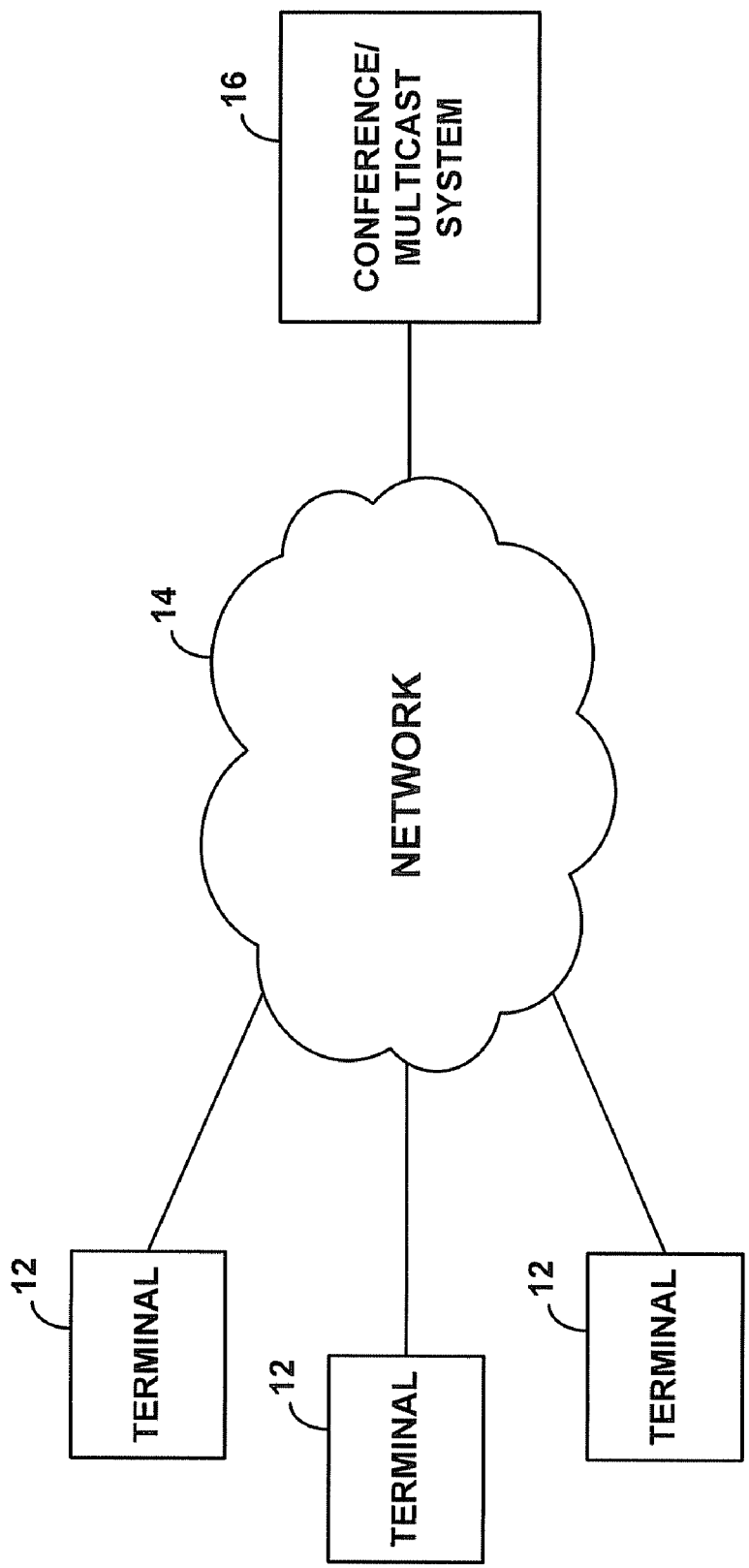
FIG. 1 is a generalized block diagram of an arrangement in which an exemplary embodiment of the invention can be implemented.

Referring to the drawings, as noted above, FIG. 1 is a generalized block diagram depicting an arrangement in which an exemplary embodiment of the invention can be implemented. As shown, a plurality of terminals 12 are in communication via a network 14 with a conference/multicast system 16. (Although three are shown, two or more would suffice.) With this arrangement, each of the terminals can establish communication with the system 16, and the system 16 can bridge the communications together so as to allow the terminals to communicate with each other, i.e., to engage in a group communication, such as a PoC session for instance.

Furthermore, with the arrangement shown, system 16 functions to support multicast communications to the terminals. Thus, in practice, when the system receives content from one of the terminals, the system may multicast the content to each of the other terminals (or for that matter to all of the terminals including the one from which the content was received). Each terminal may join the multicast group for this purpose by sending a multicast JOIN message to the system 16 and receiving in response from the system 16 (or in some other manner) data such as a multicast IP address and the like that will enable the terminal to receive and process multicast communications for the group. In a half-duplex session, for instance, the system 16 may receive communications from the terminal that currently holds the floor and may then efficiently multicast those communications to the other terminals.

Figure 2:
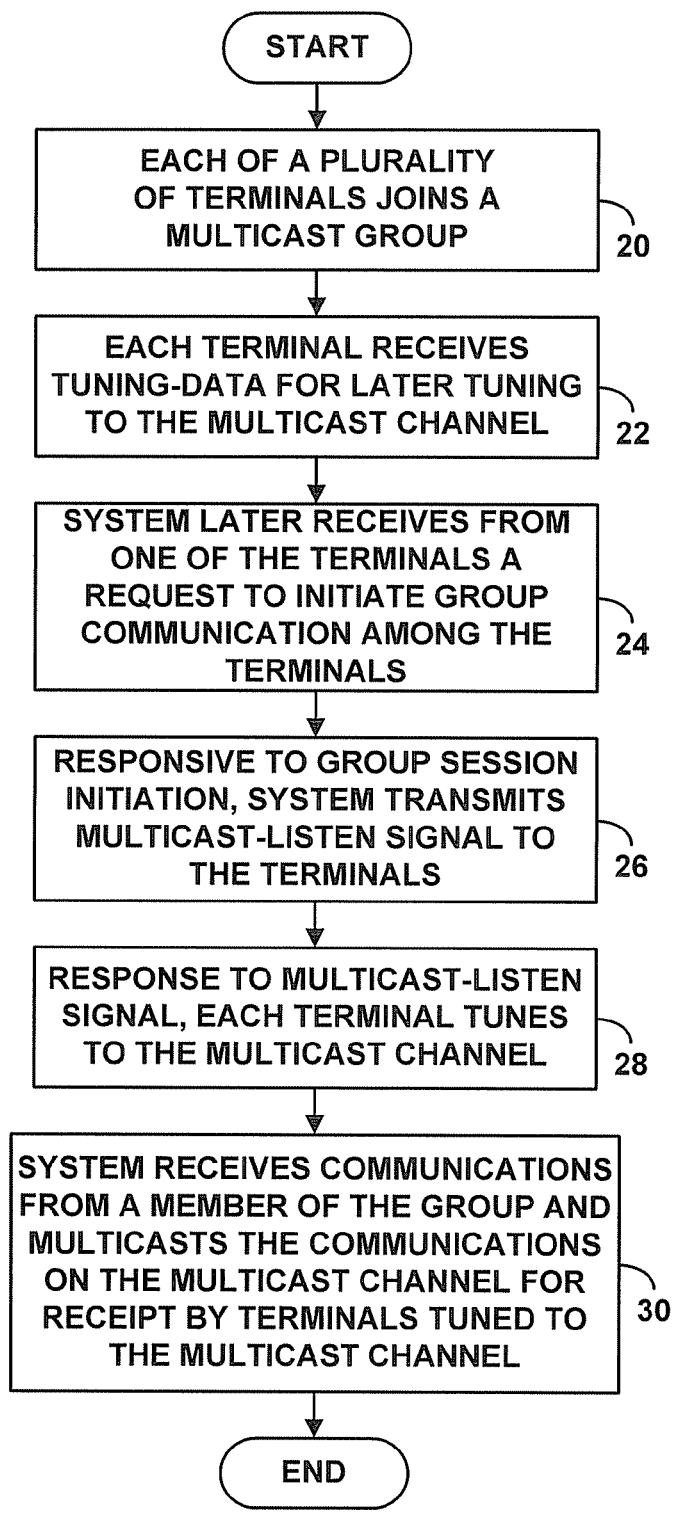
FIG. 2 is a flow chart depicting functions that can be carried out in the arrangement of FIG. 1.

Referring next to FIG. 2, a flow chart is provided to illustrate functions that can be carried out in the arrangement of FIG. 1, pursuant to the exemplary embodiment. The method functions to establish multicast communications for the set of terminals 12 and in particular to facilitate multicasting communications from system 16 to the terminals, and preferably to support communication among the terminals via system 16. As such, the invention assumes that a multicast group will be defined for the set of terminals, and each terminal will join the multicast group to be able to receive multicast communications.

As shown in FIG. 2, at step 20, the process begins as each terminal 12 thus joins the multicast group. For instance, system 16 may define a multicast flow-ID for the multicast group, and each terminal may be pre-provisioned with data indicating that multicast flow-ID. To join the multicast group, the terminal may then transmit to system 16 a JOIN message that designates the multicast flow-ID. Preferably, the terminal will do this automatically, such as in response to power-on or some other triggering event, which can effectively randomize the times when the various terminals 12 engage in JOIN signaling to join the multicast group.

Upon (or as part of) joining the multicast group, at step 22, each terminal will receive from the system 16 some data that will allow the terminal to tune to the associated multicast channel, i.e., to receive and process communications multicast to the multicast group. As noted above, for instance, the data may comprise a multicast IP address and security information (e.g., a filter, mask, key, or the like), so that the terminal can detect and process packets transmitted to the multicast IP address. At this point in the process, however, the terminal will merely store that data for later reference. The terminal will not yet tune to the multicast channel. That is, although the terminal has joined the multicast group, the terminal will act as though it has not joined the group, as the terminal will not look for packets destined to the multicast IP address or will disregard such packets as though it had not joined the group.

At step 24, system 16 will receive from one of the terminals 12 a request to initiate a communication session among the terminals 12. For instance, the request could be a PoC initiation request generated when a user pressed a PoC button on the transmitting terminal.

In response to the initiation request, at step 26, system 16 will then transmit (or cause to be transmitted) a multicast-listen signal to each of the terminals 12, directing the terminals to tune to the multicast channel that the terminals had already joined. For instance, the multicast-listen signal may comprise an updated multicast channel listing that newly includes the multicast channel corresponding to the established multicast group.

In response to receipt and detection of the multicast-listen signal, at step 28, each terminal 12 (with the possible exception of the one that will hold the floor) will then readily tune to the multicast channel, pursuant to the tuning data that the terminal previously received. Thus, each terminal will then be in a state where the terminal will receive and process communications that are multicast to the multicast group, i.e., on the multicast channel. Yet advantageously, there would be no need to engage in multicast JOIN signaling at that time, since the terminals would already be members of the multicast group.

At step 30, as system 16 receives communications from one of the terminals (e.g., the one that holds the floor), the system 16 will then multicast the communications via the multicast channel to the set of terminals 12 (or at least to those that do not hold the floor), by transmitting the communications to the multicast IP address established for the multicast group for instance. That way, the terminals can efficiently receive the communications.

Figure 3:
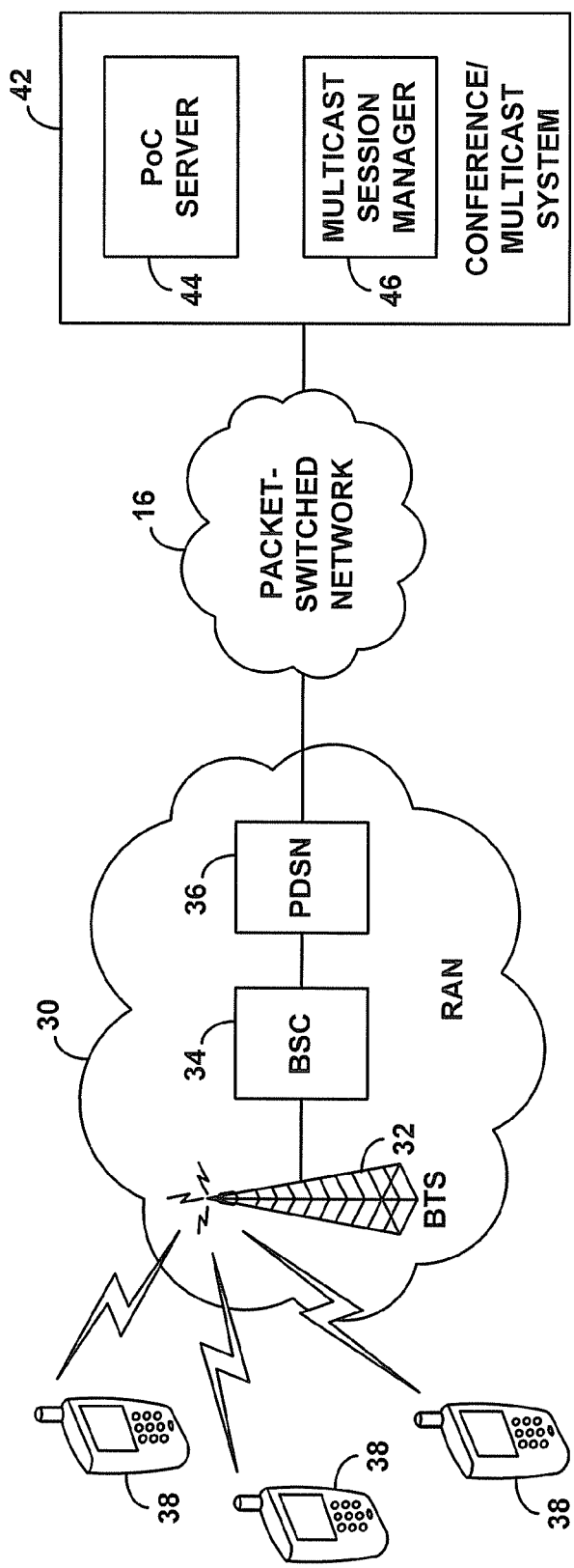
FIG. 3 is a simplified block diagram of a cellular communication network in which the exemplary embodiment can be implemented.

Referring next to FIG. 3, a simplified block diagram of a cellular communication network is provided, to illustrate a more specific arrangement in which the exemplary embodiment can be implemented.

The cellular communication network is shown including at its core an exemplary radio access network (RAN) 30, including a BTS 32, a BSC 34, and a packet gateway such as a packet data serving node (PDSN) 36. The BTS 32 radiates to define a wireless coverage area such as a cell sector in which a plurality of wireless terminals 38 can operate. The BTS 32 is coupled with the BSC 34, which controls aspects of air interface communications and is then coupled with the packet gateway 36. And the packet gateway 36 in turn provides connectivity with a packet-switched network 40, such as the Internet or, more likely, a wireless carrier's core packet network.

Shown coupled with the packet-switched network is then a conference/multicast system 42, which functions generally as described above. As further shown, the conference/multicast system 42 may include a number of nodes, each of which may sit at an IP address on the packet network 40 or may otherwise be situated to communicate with other entities on the packet network 38. Included among the nodes in the example arrangement shown are a PoC server 44 and a multicast session manager 46.

The PoC server 44 functions as a conference server (such as a multipoint conference unit and/or other equipment), able to set up and establish communication legs with various terminals and to bridge the legs together so as to allow the terminals to communicate with each other via the server 42.

For instance, to establish PoC communication through traditional means, the PoC server 44 may receive from a given one of the wireless terminals a PoC session initiation request such as a SIP INVITE message for instance, designating the other terminals by identifiers or by a group identifier generally. In response, the PoC server may respond to the initiating terminal with a SIP 200 OK, and receive a SIP ACK from the terminal to complete setup of a conference leg (e.g., RTP leg) between the server and the terminal. Further, the PoC server may send a SIP INVITE to each of the other terminals inviting them to participate in the PoC session, receive a SIP 200 OK from each such terminal, and respond to each with a SIP ACK to complete setup of a conference leg with each terminal.

If the conference legs are bidirectional, the PoC server may then readily bridge the legs together to enable the terminals to communicate with each other via the PoC server. On the other hand, in the arrangement as presently contemplated, a more efficient way to convey PoC group communications from the PoC server to the various participating terminals 38 will be to multicast the communications from the PoC server to the terminals.

The multicast session manager (MSM) 46 functions to manage multicast communications to wireless terminals, although various functions described herein as being carried out by the MSM could just as well be carried out by the PoC server 44 or by some other entity. In the exemplary embodiment, MSM may manage multicast communications, including multicast group memberships, etc., for one or more multicast content servers such as PoC server 44. Thus, there may be additional multicast content servers (not shown), equally capable of multicasting content on one or more multicast channels to multicast group members.

In practice, the MSM 46 preferably distributes to wireless terminals (such as terminals 38) multicast channel listings, listing multicast channels provided by one or more multicast content servers. The channel listings may take various forms, such as rudimentary XML data for instance, listing for each channel some descriptive data (e.g., an ASCII name of the channel) and a multicast flow-ID that can be used as a key to request membership in the associated multicast group. The MSM 46 may distribute the multicast channel listing to wireless devices by delivering the channel listing (through multicast or through a SIP subscribe/notify mechanism, for instance) to various RAN entities, such as one or more base stations, with the base stations then regularly broadcast the channel listings over a control channel (e.g., paging channel message) for receipt and storage by terminals in coverage.

When a multicast content server changes the channels that it will be multicasting, the server may signal to the MSM 46 (through any agreed signaling protocol via network 38 for instance) to alert MSM 46 of the new channel lineup (or single channel, if only one), and the MSM 46 may revise the channel listing accordingly. When the MSM 46 has a changed multicast channel listing, it will then distribute the changed channel listing, for receipt by served wireless terminals as described above. Thus, the served wireless terminals will regularly have in storage an indication of the available multicast channels, to which a user may elect to have a terminal tune.

As described above, in normal practice, when a user selects a multicast channel, the terminal may conventionally join the associated multicast group, if authorized to do so. In particular, the terminal may responsively send a JOIN message as a control channel message to the RAN, and the RAN may then pass it as packet-data to the MSM 46. Alternatively, the terminal may transmit the JOIN message as bearer packet data over a wireless packet data connection if possible. Preferably, the JOIN message would contain the multicast flow-ID that the channel listing indicated for the selected multicast channel. After authenticating/authorizing the terminal (by reference to profile data for instance), the MSM 46 may then send to the terminal, in a JOIN reply, data usable by the terminal to tune to the requested multicast channel, such as a multicast IP address for the channel, and security data to facilitate uncovering content multicast to that address.

Figure 4:
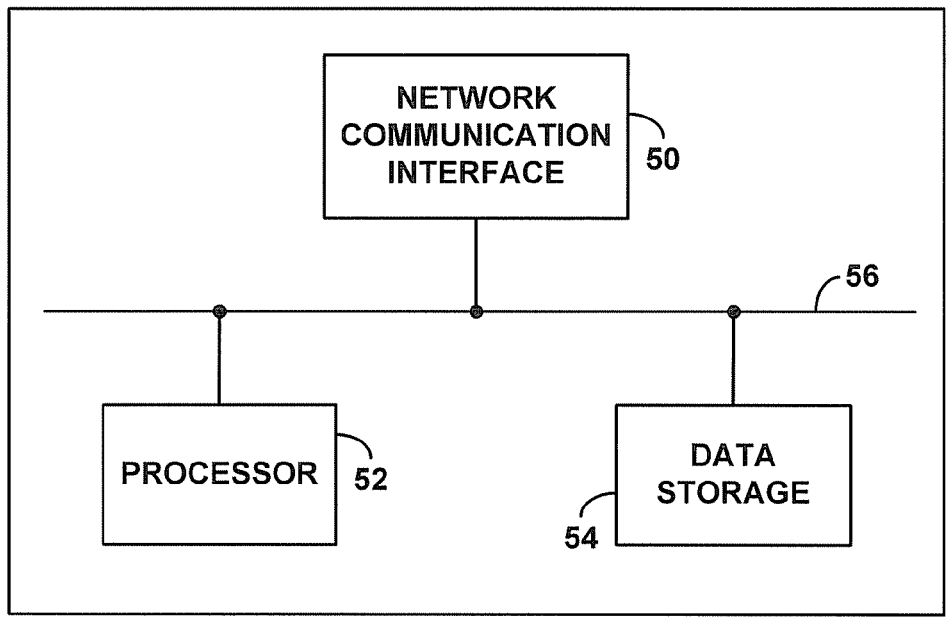
FIG. 4 is a simplified block diagram of an entity operable in a conference/multicast system in accordance with the exemplary embodiment.

FIG. 4 is a simplified block diagram of an entity such as PoC server 44 and/or MSM 46, showing functional components that can be included in such an entity. As shown, the entity includes a network communication interface 50, a processor 52, and data storage 54, all coupled together by a system bus, network, or other connection mechanism 56. It should be understood that this is intended to be a simplified example; in practice, the entity may be far more complex, possibly made up of numerous servers operating cooperatively.

Network communication interface 50 provides connectivity, and facilitates communication, with network 38. As such, the interface might comprise an Ethernet network communication interface or may take other forms, supporting wireless and/or wired communication.

Processor 52 comprises one or more general purpose processors (e.g., INTEL microprocessors) and/or one or more special purpose processors (e.g., digital signal processors, application specific integrated circuits, etc.) Data storage 54 then comprises one or more volatile and/or non-volatile storage components, such as optical, magnetic, or organic storage, and can be integrated in whole or in part with processor 52. In the exemplary embodiment, data storage 54 stores various data and program instructions to facilitate implementation of the exemplary embodiment. For instance, data storage 54 may contain multicast channel definitions, PoC group definitions, and the like. And data storage 54 may contain program instructions executable by processor 52 to facilitate receipt and processing of multicast JOIN messages, receipt and processing of PoC session initiation messages, and so forth.

Each of the wireless terminals 38 shown in the figure can take various forms. For instance they can be cellular wireless communication devices such as cell phones or wirelessly-equipped personal digital assistants or computers. Further, they can all be the same type of device, or they can take various forms.

Figure 5:
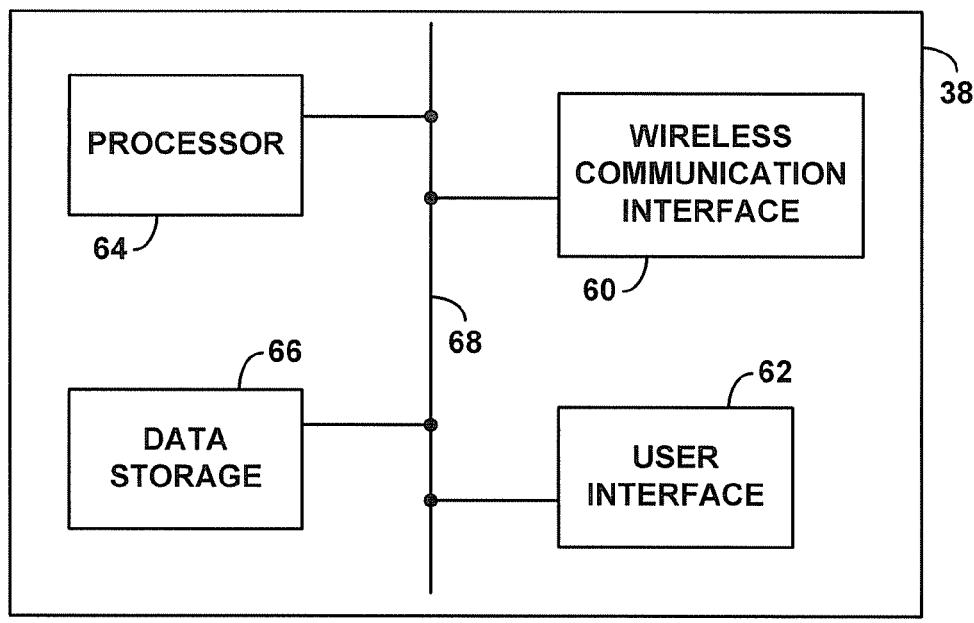
FIG. 5 is a simplified block diagram of a wireless terminal operable in accordance with the exemplary embodiment.

FIG. 5 is a simplified block diagram of an example wireless terminal 38, showing functional components that can be included in such a terminal. As shown, the exemplary wireless terminal 38 includes a wireless communication interface 60, a user interface 62, a processor 64, and data storage 66, all of which can be coupled together by a system bus, network, or other connection mechanism 68.

Wireless communication interface 60 may comprise a cellular wireless chipset of the type arranged to engage in air interface communication with RAN 12 through an agreed protocol, examples of which include CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and others now known or later developed. (As such, the assumption is that RAN 12 is arranged to commensurately communicate over the air with the wireless terminals, so the RAN will support the agreed protocol as well.) Further, the wireless communication interface 60 preferably includes one or more antennas (not shown) to facilitate air interface communication.

User interface 62 provides a mechanism through which a user can interact with the terminal. The user interface 62 preferably includes input components such as a keypad, a microphone, a camera, and/or a touch-sensitive screen, and output components such as a display screen and loudspeaker. The user interface also preferably includes analog-digital conversion circuitry and underlying control logic for interfacing with a user, such as to convert digital content to a presentable analog form and to receive analog content and convert it to digital form for transmission or other processing. User interface 62 also preferably includes a PoC button, which a user of the terminal can invoke to initiate PoC communication or to request the floor in an existing PoC session.

For normal multicast operation, user-interface 62 may function to display to a user a list of available multicast channels, and to receive a user selection of a desired channel, in response to which the terminal may then send a JOIN message to join the selected multicast group and begin receiving the content that is being multicast on that channel.

Processor 64 may comprise one or more general purpose processors (e.g., INTEL processors) and/or one or more specialized processors (e.g., digital signal processors and/or application specific integrated circuits). Data storage 66, in turn, comprises one or more volatile and/or non-volatile storage components, such as optical, magnetic, or organic memory or other types of storage components, and can be integrated in whole or in part with processor 64. In the exemplary embodiment, data storage 66 stores various data and program instructions to facilitate implementation of the exemplary embodiment.

For example, the data storage 66 may function to store a multicast channel listing received as described above. Further, the data storage may be pre-provisioned to contain a PoC multicast flow-ID for use in joining a PoC multicast group and for use in detecting the presence of the PoC multicast flow-ID in a multicast channel listing. For instance, at some time in advance, a user could define the set of terminals that will function as the PoC group (a buddy group), through an online interface for instance, and system 42 could responsively assign a multicast flow-ID for the group. That assigned multicast flow-ID could then be provisioned into each terminal through over-the-air provisioning or in some other manner.

Still further, data storage 66 may contain program instructions executable by processor 64 to automatically join the PoC multicast group upon power-up of the terminal and/or in response to some other designated trigger event, and thus to receive data (e.g., multicast IP address, etc.) that will enable the device to tune to the associated PoC multicast channel. Further, the program instructions could be executable to later detect the presence of the multicast flow-ID in the multicast channel listing and responsively tune to the PoC multicast channel so as to facilitate receiving PoC group communications.

Note that in an alternative embodiment, data storage 66 may be pre-provisioned with the data enabling the device to tune to the PoC multicast channel. In that case, the program instructions then need not function to join the PoC multicast group, since the terminal may already be a member of the PoC multicast group. In that case, all that need happen is for the system 42 to provide a multicast-listen signal (e.g., an updated multicast channel listing) to the terminal, to cause the terminal to tune to the PoC multicast channel.

Figure 6:
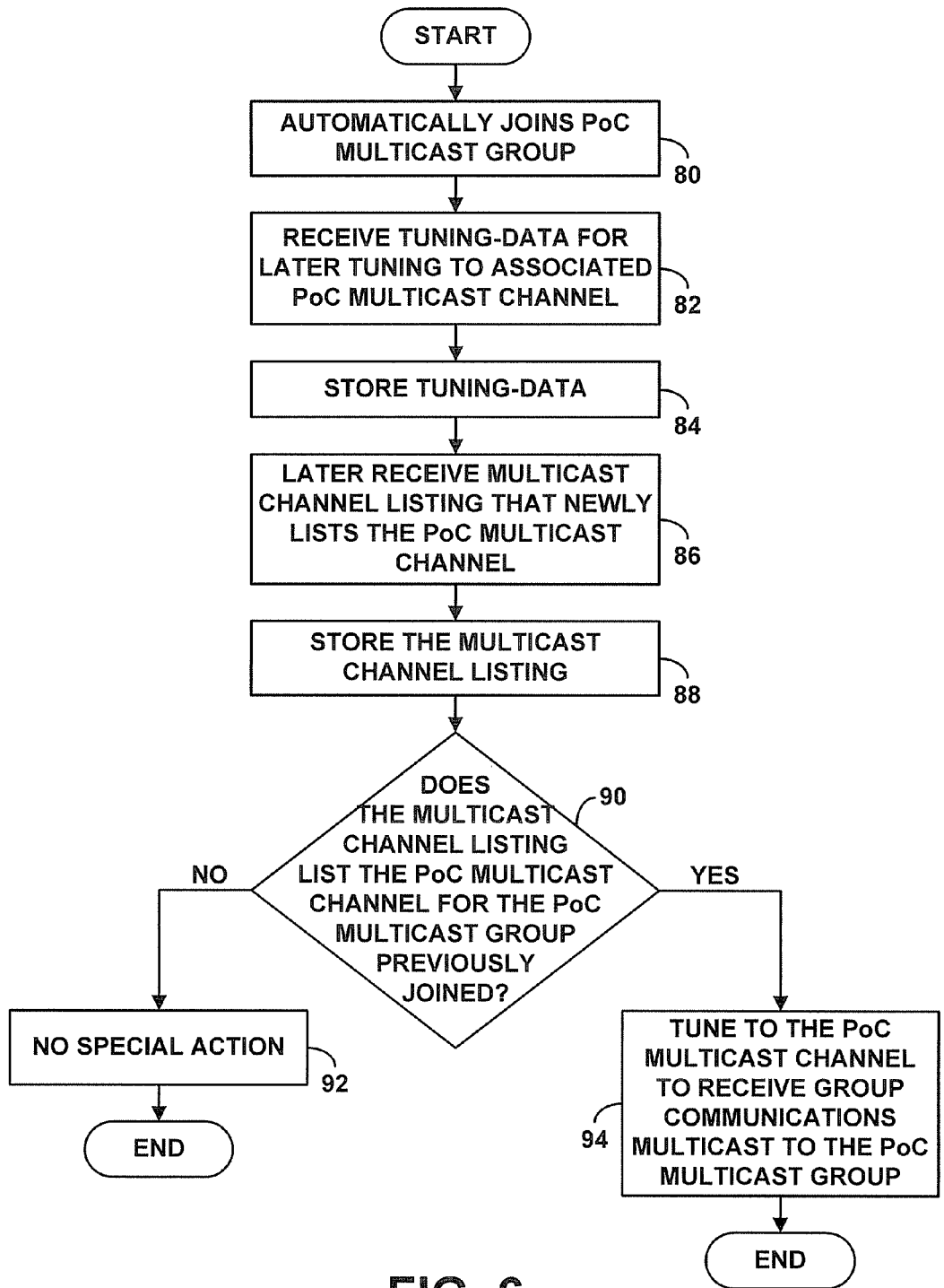
FIG. 6 is a flow chart depicting functions that can be carried out by a wireless terminal in accordance with the exemplary embodiment.
Figure 7:
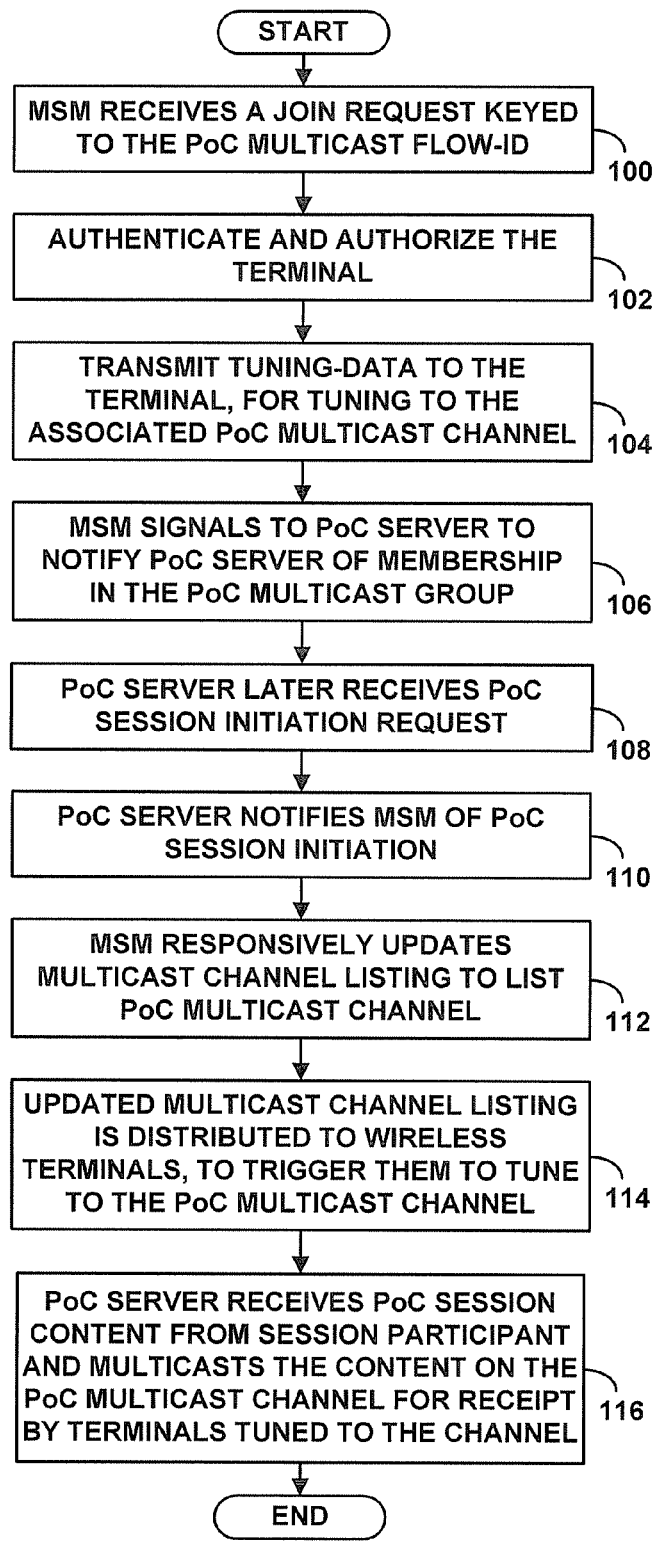
FIG. 7 is a flow chart depicting functions that can be carried out by a conference/multicast system in accordance with the exemplary embodiment.

FIGS. 6 and 7 are next flow charts depicting sets of functions that can be carried out pursuant to the exemplary embodiment, in the arrangement shown in FIG. 3. FIG. 6 depicts a process from the perspective of a wireless terminal 38, and FIG. 7 depicts a process from the perspective of system 42. It should be understood that the invention could also involve a combination of some or all of these functions, i.e., functions carried out cooperatively by a terminal 38 and the system 42, as described above for instance.

As shown in FIG. 6, at step 80, the process begins with the terminal 38 automatically joining a PoC multicast group. As discussed above, the terminal is preferably pre-provisioned with a multicast flow-ID associated with its PoC group, in this case comprising at least the set of terminals 38. In practice, the terminal may be provisioned with multiple such multicast flow-IDs, each associated with a respective PoC group, and the terminal may automatically join each PoC multicast group.

The automatic joining function 80 preferably occurs when the terminal initially powers on, e.g., as part of a terminal startup routine. However, the function can occur automatically in response to other events, as long as it occurs before PoC session initiation as described later.

At that point, processor 64 may determine whether it has stored a PoC multicast flow-ID and perhaps whether it is set to automatically join in accordance with this invention. The processor may then generate and send to MSM 46 a multicast JOIN message, seeking to join the PoC multicast group associated with the multicast flow-ID. As noted above, the terminal may transmit the JOIN message as a control channel message or as bearer data on a traffic channel. In either case, the RAN may note the JOIN action for purposes of later multicasting incoming traffic to any member terminals in the coverage area; and the RAN may forward the JOIN message along to the MSM 46.

Likely as part of the automatic joining function, but as illustrated separately at step 82 in FIG. 6, the terminal will receive in response from the MSM 46 data (e.g., multicast IP address, etc.) that will enable the terminal to tune to the PoC multicast channel at some later point. And at step 84, the terminal will store that data for later reference.

In an optimal arrangement, the process described so far will be carried out independently by each of the terminals 38. Because each terminal will probably be powered on at a different time, the process will thus likely be carried out at different times by the different terminals, thus effectively randomizing the timing of their JOIN signaling, and helping to overwhelm network resources.

At some later time, at step 86, the terminal will receive from system 42 a new multicast channel listing or an update of an existing multicast channel listing, newly including in the list the PoC multicast channel having the PoC multicast flow-ID that the terminal used to join the PoC multicast group. In one embodiment, the multicast channel listing may list just one multicast channel (i.e., a listing of just one), the PoC multicast channel. In another embodiment, the multicast channel listing may list numerous multicast channels, including the PoC multicast channel as well as other multicast channels such as those described in the background section above for instance. In any event, at step 88, the terminal will store the multicast channel listing.

At step 90, the processor may then determine whether the multicast channel listing includes an entry having a multicast flow-ID that matches the PoC multicast flow-ID that the terminal used to join the PoC multicast group, or otherwise whether the channel listing designates the PoC multicast group. If not, then at step 92, the processor will take no special action in response. On the other hand, if so, then at step 94, the processor will (with or without prompting a user and receiving user authorization) responsively tune to the PoC multicast channel. Thus, the terminal will begin receiving and processing communications that system 42 multicasts to the PoC multicast group.

Note that the multicast channel listing, typically being overhead data that is received by most or all terminals in a given coverage area, may be received by terminals that had not earlier joined the PoC multicast group in accordance with the exemplary embodiment. Such terminals would of course not be able to tune to the PoC multicast channel, as they would not have the necessary multicast IP address (or security data if necessary). Thus, it would make sense to not even show the PoC multicast channel in the multicast channel listing if and when the listing is presented to a user of a recipient terminal. Accordingly, the PoC multicast channel is preferably flagged in the multicast channel listing to remain hidden or invisible (i.e., not shown), even though a terminal that had previously joined the PoC multicast group in accordance with the invention will detect the presence of the PoC multicast channel in the listing and readily tune to the PoC multicast channel as described above.

Once the terminal is tuned to the PoC multicast channel for the previously joined PoC multicast group, the terminal can then receive PoC communications multicast on that channel. Thus, when any other terminal holds the floor in the PoC session and sends content to the PoC server, the PoC server may simply multicast that content to the PoC multicast group, for receipt by the group members.

As shown in FIG. 7, from the perspective of system 42, the process begins at step 100, when MSM 46 receives from each wireless terminal 38 respectively a JOIN request seeking to join the PoC multicast group keyed to the predefined PoC multicast flow-ID. And at step 102, the MSM 46 may engage in various authentication and authorization of the terminal. If appropriate, then at step 104, the MSM 46 may responsively transmit to the terminal data that will enable the terminal to tune to the PoC multicast channel. Further, at step 106, the MSM 46 will preferably signal to the PoC server 44 to notify the PoC server 44 that terminals have joined the PoC multicast group. That way, the PoC server will later sensibly multicast PoC session content to the terminals.

At step 108, at some time later, the PoC server will receive from one of the terminals a PoC session initiation request, such as a SIP INVITE for instance. In response, the PoC server may engage in further signaling with that terminal and with the other terminals to set up with each terminal a PoC session leg for use in allowing the terminal to transmit PoC session content to the PoC server when the terminal holds the floor. And the assumption is that the terminal that initiated the PoC session would initially hold the floor, so the leg with that terminal would be currently active.

Further, at step 110, in response to receipt of the PoC session initiation request (e.g., in response to initiation of the PoC session), the PoC server 44 will notify the MSM 46 that the PoC session is being initiated, or the PoC server 44 will otherwise signal to the MSM 46. And at step 112, the MSM 46 will then update (or newly create) the multicast channel listing to newly list the PoC multicast channel with the associated PoC multicast flow-ID. Thus, at step 114, the multicast channel listing newly listing the PoC multicast channel with the associated PoC multicast flow-ID will be transmitted from the MSM 46 for ultimate distribution by one or more radio access networks to served wireless terminals. And each wireless terminal that had joined the PoC multicast group already will detect that the multicast channel listing newly lists the PoC multicast channel with the associated PoC multicast flow-ID and will thus automatically tune to the PoC multicast channel.

At step 116, as the PoC server receives PoC session content from any one of the PoC group members, the PoC server will then simply multicast that PoC session content on the PoC multicast channel for receipt by each of the terminals. (In practice, the terminal holding the floor may disregard any such multicast content, to avoid creating an echo of the terminal's own transmission.)

An exemplary embodiment of the present invention has been described above. Those skilled in the art will understand, however, that changes and modifications may be made to this embodiment without departing from the true scope and spirit of the present invention, which is defined by the claims.

Further, although the invention can be usefully applied in setting up a PoC session as described above, it should be understood that the invention may have broader applicability as well.

We claim:

1. In a cellular wireless communication device, a method to facilitate push-to-x over cellular (PoC) multicast communication for a PoC session among parties including the cellular wireless communication device, the method comprising:

the device automatically joining a PoC multicast group having an associated multicast channel, the automatic joining occurring before a PoC session initiation request is sent for the PoC session, and the automatic joining comprising sending a multicast JOIN message;

after the PoC session initiation request is sent for the PoC session, the device receiving a multicast channel listing that newly lists the multicast channel as a channel available for use; and in response to receipt of the multicast channel listing that newly lists the multicast channel, the device tuning to the multicast channel so as to receive PoC communications of the session that are multicast on the multicast channel.

2. The method of claim 1, wherein receiving the multicast channel listing comprises receiving the multicast channel listing from a network system that has generated the multicast channel listing in response to initiation of the PoC session.

3. The method of claim 1, further comprising maintaining in data storage of the cellular wireless communication device a PoC multicast flow-ID associated with the PoC multicast group and multicast channel, wherein the multicast JOIN message specifies the PoC multicast flow-ID, wherein the multicast channel listing lists the PoC multicast flow-ID for the multicast channel, and wherein tuning to the multicast channel in response to receipt of the multicast channel listing that newly lists the multicast channel comprises detecting the multicast flow-ID in the multicast channel listing and responsively tuning to the multicast channel.

4. The method of claim 1, wherein the JOIN message includes a multicast flow-ID for the PoC multicast group, wherein joining the PoC multicast group further comprises receiving, in response to successfully joining the PoC multicast group, data enabling the cellular wireless communication device to tune to the multicast channel, and wherein tuning to the multicast channel comprises using the data to tune to the multicast channel.

5. The method of claim 4, wherein the data comprises (i) a multicast IP address to which content on the multicast channel is transmitted and (ii) security data enabling the content to be processed.

6. The method of claim 1, wherein automatically joining the PoC multicast group comprises automatically joining the PoC multicast group in response to a device-specific event.

7. The method of claim 6, wherein the device-specific event comprises the device transitioning to a power-on state.

8. A method of establishing push-to-x over cellular (PoC) multicast communication among a set of terminals via a network system, the method comprising:

receiving into the network system, respectively from each terminal, a JOIN message automatically generated by the terminal for seeking to join a PoC multicast group, and responsively transmitting to the terminal tuning-data that enables the terminal to tune to a multicast channel for the PoC multicast group;

thereafter receiving into the network system, from a given one of the terminals, a PoC session initiation request;

responsive to PoC session initiation, sending from the network system to each terminal a multicast channel listing that newly lists the multicast channel, as a trigger for the terminal to tune to the multicast channel; and thereafter multicasting PoC session content to the terminals via the multicast channel, for receipt by the terminals.

9. The method of claim 8, wherein the network system comprises a PoC server and a multicast session manager (MSM), wherein receiving the PoC session initiation request comprises the PoC server receiving the PoC session initiation request, the method further comprising:

signaling from the PoC server to the MSM in response to PoC session initiation, wherein sending the multicast channel listing comprises the MSM sending the multicast channel listing.

10. The method claim 8, wherein the tuning-data comprises (i) a multicast IP address to which the network system will multicast PoC session content on the multicast channel, and (ii) security data for uncovering the PoC multicast content that is multicast on the multicast channel.

11. The method of claim 8, wherein each JOIN request specifies a PoC multicast flow-ID associated with the PoC multicast group and multicast channel, and the multicast channel listing specifies the PoC multicast flow-ID associated for the multicast channel.

12. A method of establishing multicast communication from a network system to a set of terminals so as to support communication among the terminals, wherein a multicast group, with an associated multicast channel is defined for the set of terminals, the method comprising:

each terminal automatically joining the multicast group, and each terminal maintaining tuning-data that enables the terminal to tune to the multicast channel so as to receive content that is multicast to the multicast group, the automatic joining comprising sending a multicast JOIN message;

thereafter receiving into the network system a request to initiate a group communication among the set of terminals, the group communication comprising a push-to-x over cellular (PoC) communication;

responsive to the request, transmitting from the network system to the set of terminals a multicast-listen signal that causes the terminals to tune to the multicast channel associated with the multicast group that the terminals had earlier joined; and responsive to the multicast-listen signal, each terminal using the tuning-data to tune to the multicast channel, and each terminal thereafter receiving on the multicast channel content that is multicast from the network system for the group communication.

13. The method of claim 12, wherein the terminals comprise cellular wireless communication devices.

14. The method of claim 12, wherein automatically joining the multicast group comprises automatically joining the multicast group in response to a terminal-specific event.

15. The method of claim 14, wherein the terminal-specific event comprises, respectively for each terminal, the terminal transitioning to a power-on state.

16. The method of claim 12,
wherein the tuning-data comprises (i) a multicast IP address to which the network system transmits content being multicast on the multicast channel, and (ii) security data enabling the terminal to uncover content that is multicast on the multicast channel,
the method further comprising receiving the tuning-data into each terminal upon the terminal joining the multicast group.

17. The method of claim 12, wherein the multicast-listen signal comprises an updated multicast channel listing that newly lists the multicast channel.

18. The method of claim 12, wherein receiving the request to initiate the group communication among the set of terminals comprises receiving the request from a given one of the terminals,
the method further comprising the network system receiving the content from the given terminal and multicasting the content on the multicast channel.

19. A cellular wireless communication device comprising:
a wireless communication interface;
a user interface; and
program logic executable to cause the device to carry out functions to facilitate push-to-x over cellular (PoC) multicast communication for a PoC session among parties including the cellular wireless communication device, the functions comprising:
(i) automatically joining a PoC multicast group having an associated multicast channel, the automatic joining occurring before a PoC session initiation request is sent for the PoC session, and the automatic joining comprising sending a multicast JOIN message,
(ii) after the PoC session initiation request is sent for the PoC session, receiving a multicast channel listing that newly lists the multicast channel as a channel available for use, and
(iii) in response to receipt of the multicast channel listing that newly lists the multicast channel, tuning to the multicast channel so as to receive PoC communications of the session that are multicast on the multicast channel.

20. The cellular wireless communication device of claim 19, further comprising data storage storing a PoC multicast flow-ID associated with the PoC multicast group and multicast channel,
wherein the multicast JOIN message specifies the PoC multicast flow-ID,
wherein the multicast channel listing lists the PoC multicast flow-ID for the multicast channel, and
wherein tuning to the multicast channel in response to receipt of the multicast channel listing that newly lists the multicast channel comprises detecting the multicast flow-ID in the multicast channel listing and responsively tuning to the multicast channel.

* * * * *